(No Model.)

E. THOMSON.
ELECTRIC MEASURING INSTRUMENT.

No. 537,501. Patented Apr. 16, 1895.

WITNESSES
Henry O. Westendarf
T. J. Johnston

INVENTOR
Elihu Thomson
by Geo. R. Blodgett,
Atty.

UNITED STATES PATENT OFFICE.

ELIHU THOMSON, OF SWAMPSCOTT, ASSIGNOR TO THE THOMSON-HOUSTON ELECTRIC COMPANY, OF BOSTON, MASSACHUSETTS.

ELECTRIC MEASURING-INSTRUMENT.

SPECIFICATION forming part of Letters Patent No. 537,501, dated April 16, 1895.

Application filed October 26, 1894. Serial No. 527,083. (No model.)

*To all whom it may concern:*

Be it known that I, ELIHU THOMSON, a citizen of the United States, residing at Swampscott, in the county of Essex, State of Massachusetts, have invented certain new and useful Improvements in Electric Measuring-Instruments, of which the following is a specification.

My invention relates to electric measuring instruments, and is equally applicable to ammeters or voltmeters.

It has for its object to provide an instrument which will have a great range of movement, and which may be, if desired, so arranged as to indicate not only the amount of potential or current, but also the direction of the latter. These main objects I attain by placing two horse-shoe magnets, or magnets of approximately that shape, side by side with two of the poles of like names adjacent. I then arrange a semi-circular yoke or pole-piece connecting these two adjacent poles and a second semi-circular yoke or pole-piece connecting the two outer poles, which are also necessarily of the same sign, thus obtaining a substantially uniform semi-circular field; and in the space between these two yokes I arrange a coil, one side of which travels in the space, while the other side is mounted in the center of the circle to which the yokes conform. By preference the path between the yokes is of a little more than one hundred and eighty degrees in extent; and by the means pointed out I am enabled to obtain a traverse of the index over the scale of the instrument of a full one hundred and eighty degrees. When used as a voltmeter I include a resistance in the circuit with the moving parts, and when used as an ammeter I provide a shunting conductor of large size forming a path around the moving parts, the resistance of the shunt and of the coil giving motion to the needle being so proportioned as to give the exact calibration desired. I may arrange the zero of the scale at either end thereof or in the middle. When arranged in the middle the index will be deflected in opposite directions from the zero by currents passing in opposite directions.

My invention further consists in the arrangement of the various parts herein pointed out, as more fully described hereinafter.

The accompanying drawings show embodiments of my invention.

Figure 1:
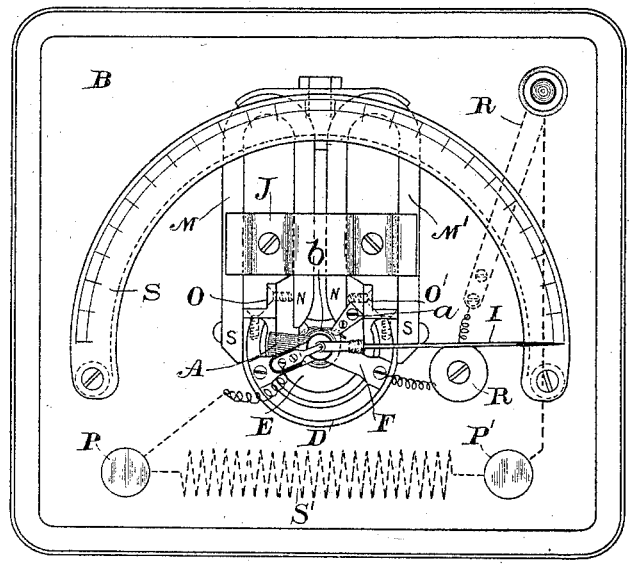
Figure 2:
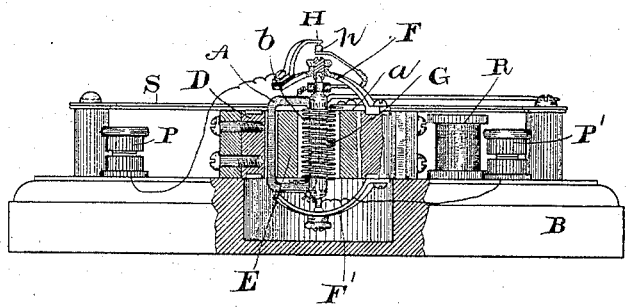

Figure 1 is a front elevation; Fig. 2, an inverted plan view, partly in section; and Fig. 3 a view of the working parts with their various supports removed for clearness of illustration.

Referring now by letter to the drawings, B is the ordinary base of any suitable material.

P, P' are the binding posts of the instrument, by which it is connected in the external circuit.

R is the resistance used when the instrument is employed as a voltmeter, and S' is the shunting path for the current when the instrument is employed as a shunt ammeter, one or the other being used as required. The use of these parts is well understood in the art.

S is a scale over which the index I reciprocates. M, M' are the magnets, in the case illustrated having their north poles brought together and connected by the yoke E, while a similar yoke D connects the two south poles, suitable screws and brass angles O, O', being employed to make the connection in any way desired.

It will thus be seen that between the poles of the magnets, or rather, between the polar extensions or yoke-pieces, D and E, there will be a passage of lines of force forming a substantially semi-circular field. The two magnets are held in place by the clamp J, or by any other proper means.

Figure 3:
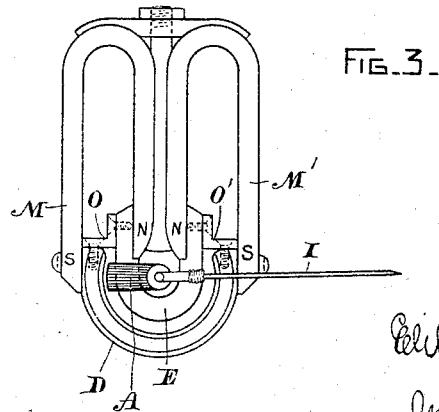

Referring more particularly to Figs. 1 and 3, A is a coil surrounding the polar extension or yoke-piece E. One side of this coil is supported upon an axle provided with suitable jewels and having bearing in the extensions F, F', Fig. 2. The coil is wound preferably with a considerable number of convolutions upon a small metallic bobbin, the axle supporting one of its sides passing through the center about which the semi-circular space between the pole-pieces D and E is described, while the other side of the coil passes through this semi-circular space. A current passed through the coil under these conditions tends to deflect it one way or the other in the space, and, as it is free to turn on its center it will be thrown to one side or the other of the interpolar space according to the direction of the current. The zero of the instrument may therefore be located on either side of the scale or at its middle portion. If it be located at one end or the other, then the current must necessarily be passed in the proper direction to deflect the index, while if it be located at the middle, it will indicate not only the potential or strength of the current, but will also indicate the direction of the current, as is well understood.

To maintain the needle at the zero position and also to afford sufficient opposition to the deflection by the current, the coil should be so loaded that its center of gravity is below the support when the needle is at zero. In this case the instrument works by gravity and will of course be mounted in proper vertical position. If however it is to be operated in a horizontal position, or is to be a portable instrument, the coil A and needle are balanced by a suitable spring $b$, shown best in Fig. 2. By preference I employ for this purpose a helical spring surrounding the axle of the coil but not touching it. As shown in Fig. 1, one end of this spring is fast to a support $a$ and the other end is fast to another support, not shown, but at the bottom of the spring. The spring is thus left in equilibrium when the index is at the zero position. The coil is attached to the central portion of the spring at G, Fig. 2, so that it tends to resist the motion of the coil in either direction. The passage of current in the coil thus tends to throw it against the pull of the spring, and the degree of this action is regulated by the strength of the current in the coil.

Any suitable expedient may be adopted for passing the current to be measured to the coil. In Figs. 1 and 2 I have illustrated a simple means. A platinum point is dipped into a cup of mercury, $h$, as shown at H, and the cup is carried upon an arm insulated from, though carried by the axle of the coil, the cup being brought to a concentric position with the axle, so that the current passes freely in all positions and without friction. I may substitute, if desired, thin flexible strips of metal; and other changes may be made in the form of the instrument without affecting the principles of its construction, all of which changes I aim to embrace in the claims.

What I claim as new, and desire to secure by Letters Patent of the United States, is—

1. In an electric measuring instrument, the means described for obtaining a substantially semi-circular magnetic field, consisting of two concentric curved yokes or pole-pieces in the same plane connecting like poles of the magnets furnishing the field.

2. In an electric measuring instrument, a pair of magnets having one pair of their poles of like sign adjacent to one another, a curved pole-piece connecting such poles, a second curved pole-piece connecting the other pair of poles of like sign, and a coil moving in the space between the two pole-pieces.

3. In an electric measuring instrument, a pair of magnets having one pair of their poles of like sign adjacent, a curved pole-piece connecting such poles, a second curved pole-piece connecting the other pair of poles of like sign, and a coil moving in the space between the pole-pieces against an opposing force.

4. In an electric measuring instrument, a pair of magnets having one pair of their poles of like sign adjacent, a substantially semi-circular pole-piece uniting such poles, a second substantially semi-circular pole-piece uniting the other pair of poles of like sign, and a coil embracing the inner one of such pole-pieces, one side of the coil moving in the space between the pole-pieces and the other side being pivoted at the center of the semi-circle.

5. In an electric measuring instrument, a pair of magnets having one pair of their poles of like sign adjacent, a substantially semi-circular pole-piece uniting such poles, a second substantially semi-circular pole-piece uniting the other pair of poles of like sign, a coil embracing the inner one of such pole-pieces, one side of the coil moving in the space between the pole-pieces, the other side being pivoted at the center of the semi-circle, and a spring opposing the motion of the coil.

6. In an electric measuring instrument, a pair of magnets having one pair of their poles of like sign adjacent, a substantially semi-circular pole-piece uniting such adjacent poles, another substantially semi-circular pole-piece uniting the other pair of poles of like sign, a coil embracing the inner one of such pole-pieces, one side of the coil moving in the space between the pole-pieces, the other side being pivoted at the center of the semi-circles, and a helical spring surrounding the axle upon which the coil is pivoted and adapted to resist the motion of the coil as it is moved by magnetic forces.

7. In an electric measuring instrument, a pair of magnets having one pair of their poles of like sign adjacent, a semi-circular pole-piece uniting the adjacent poles, a second semi-circular pole-piece concentric with the first uniting the other pair of poles, a coil one side of which passes between the pole-pieces and the other side of which is pivoted upon an axle at their common center, a helical spring surrounding such axle, and a connection between the coil and the spring at the middle point of the spring.

8. In an electric measuring instrument, a pair of magnets having one pair of their poles of like sign adjacent, a substantially semi-circular pole-piece uniting the adjacent poles, a second semi-circular pole-piece concentric with the first uniting the other pair of poles of like sign, a coil embracing the inner one of such pole-pieces having one side moving between them and its opposite side pivoted upon an axle at their common center, circuit connections conveying the current to be measured, and a helical spring surrounding the axle and opposing the motion of the coil, the spring being attached at its middle point to the coil, whereby it may resist the motion of the coil equally in either direction, substantially as described.

In witness whereof I have hereunto set my hand this 24th day of October, 1894.

ELIHU THOMSON.

Witnesses:
JOHN W. GIBBONEY,
HENRY O. WESTENDARP.